United States Patent [19]

Iizuka

[11] Patent Number: 5,291,979
[45] Date of Patent: Mar. 8, 1994

[54] AUTOMATIC TRANSMISSION LOCKUP CLUTCH CONTROL APPARATUS

[75] Inventor: Naonori Iizuka, Fuji, Japan
[73] Assignee: JATCO Corporation, Fuji, Japan
[21] Appl. No.: 3,424
[22] Filed: Jan. 12, 1993
[51] Int. Cl.[5] ........................ B60K 41/28; F16H 45/02
[52] U.S. Cl. .................................. 192/.092; 74/890; 192/3.3; 192/3.31; 192/3.58
[58] Field of Search .................. 192/.033, .092, 3.3, 192/3.31, 3.58; 74/890, 733.1; 475/62, 65

[56] References Cited

U.S. PATENT DOCUMENTS 4,825,366 4/1989 Yamamoto et al. ............ 192/.092 X
4,940,122 7/1990 Fujieda ........................... 192/3.3 X

FOREIGN PATENT DOCUMENTS 0031075 2/1990 Japan .......................... 192/3.31
2-236057 9/1990 Japan .

*Primary Examiner*—Rodney H. Bonck
*Attorney, Agent, or Firm*—Foley & Lardner

[57] ABSTRACT

An apparatus for operating a lockup clutch to provide a controlled degree of slip between the impeller and the turbine in an automatic transmission. A gear ratio is calculated from a relationship specifying the gear ratio as a function of selected gear change mode and time elapsed after the selected gear change mode starts. The calculated gear ratio is used, along with the transmission output shaft speed to calculate a speed of rotation of the turbine. The lockup clutch is operated in a slip lockup mode to bring a difference between the engine and turbine speeds to a predetermined value. Engine speed changes are monitored to measure a time interval required for the gear change of the selected mode. The relationship is modified to correct the gear ratio stored for the selected gear change mode based upon the measured time interval.

6 Claims, 4 Drawing Sheets

AUTOMATIC TRANSMISSION LOCKUP CLUTCH CONTROL APPARATUS

BACKGROUND OF THE INVENTION

This invention relates to an automatic transmission lockup clutch control apparatus for use with an automotive vehicle.

Automatic transmission lockup clutch control apparatus have been proposed, for example, in Japanese Patent Kokai No. 2-236057, to operate a lockup clutch provided in an automatic transmission in a slip lockup mode so as to bring a difference between the engine speed and the turbine speed to a predetermined value. The conventional lockup clutch control apparatus calculates the turbine speed based upon the transmission output shaft speed and the gear ratio calculated for the selected gear shift mode.

The conventional lockup control apparatus requires no turbine speed sensor and has the advantages in easy application to existing automatic transmission and less space consumption. However, the conventional lockup control apparatus cannot provide a constant degree of slip in the lockup clutch over a long period of time since the gear ratio estimated for a specified one of various gear change modes will change because of changes of the lockup clutch with time, engine output torque fluctuations and variations in the friction factor of the friction surface of the lockup clutch.

SUMMARY OF THE INVENTION

It is a main object of the invention to provide an improved automatic transmission lockup control apparatus which can absorb changes in the slip condition of the lockup clutch caused by engine output torque fluctuations, lockup clutch variations and changes in the lockup clutch with time.

There is provided, in accordance with the invention, a lockup clutch control apparatus for use in an automotive vehicle including an internal combustion engine having a throttle valve, and an automatic transmission having an output shaft, an impeller, a turbine and a lockup clutch for producing selected one of a plurality of modes of gear change. The lockup clutch control apparatus comprises first sensor means sensitive to a speed of rotation of the engine for producing a first sensor signal indicative of a sensed engine speed, second sensor means sensitive to a speed of rotation of the transmission output shaft for producing a second sensor signal indicative of a sensed transmission output shaft speed, and a control unit coupled to the first, second and third sensor means for controlling the lockup clutch. The control unit includes means for measuring a lapse time after the selected gear change mode starts, means for calculating a gear ratio from a relationship specifying the gear ratio as a function of the selected gear change mode and the measured lapse time, means for calculating a speed of rotation of the turbine based upon the sensed transmission output shaft speed and the calculated gear ratio, means for calculating a difference between the sensed engine speed and the calculated turbine speed, means for operating the lockup clutch in a slip lockup mode to bring the calculated difference to a predetermined value, means for monitoring changes in the sensed engine speed to measure a time interval required for the gear change of the selected mode, and means for modifying the relationship to correct the gear ratio stored for the selected gear change mode based upon the measured time interval.

BRIEF DESCRIPTION OF THE DRAWINGS

This invention will be described in greater detail by reference to the following description taken in connection with the accompanying drawings, in which.

DETAILED DESCRIPTION OF THE INVENTION

Figure 1:
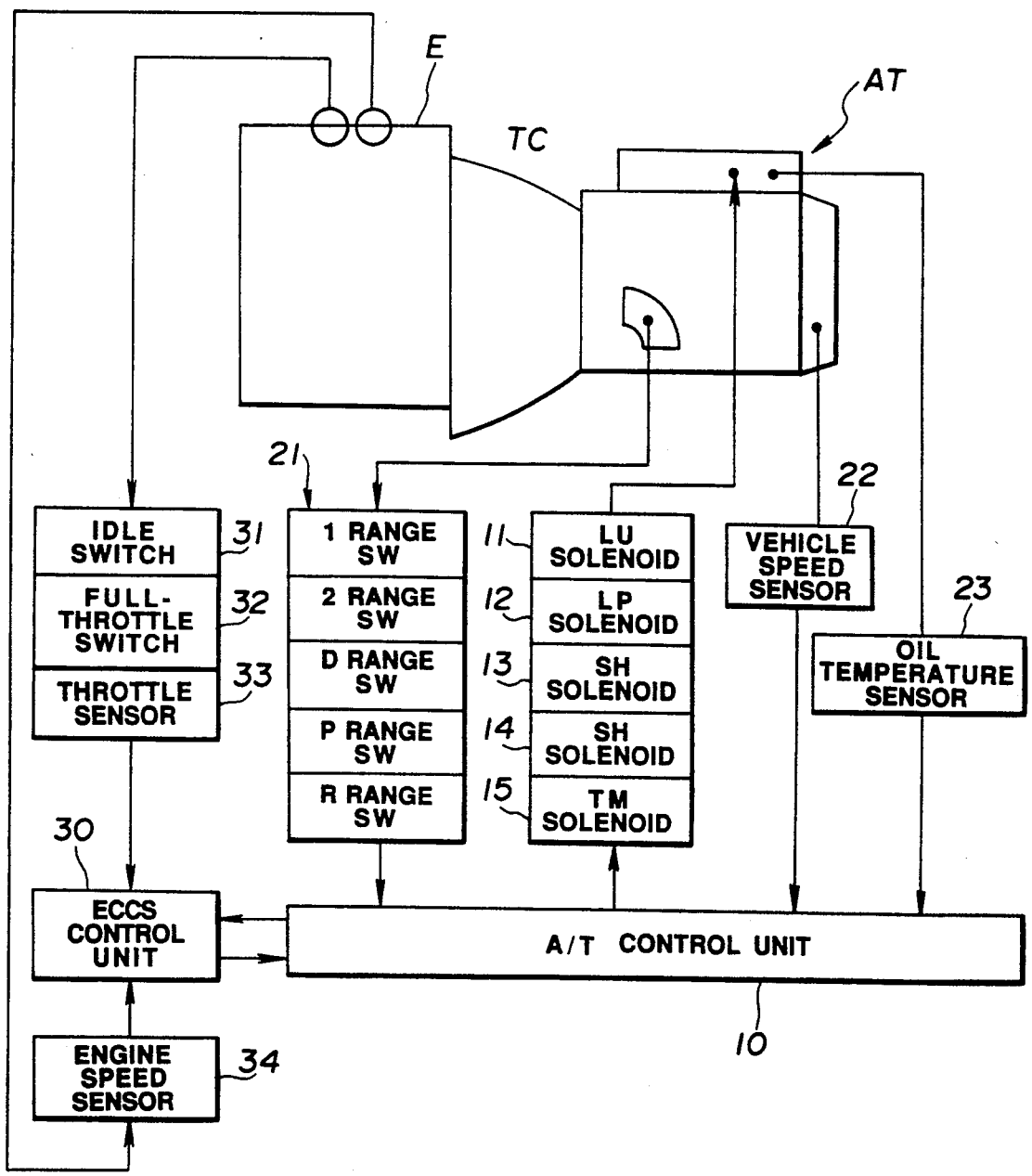
FIG. 1 is a schematic block diagram showing one embodiment of a lockup clutch control apparatus made in accordance with the invention.

With reference to the drawings and in particular to FIG. 1, there is shown a schematic block diagram of a lockup clutch control apparatus embodying the invention. The lockup clutch control apparatus is used with an automotive vehicle having an internal combustion engine E, and an automatic transmission AT having a torque converter TC provided with a lockup mechanism.

Figure 2:
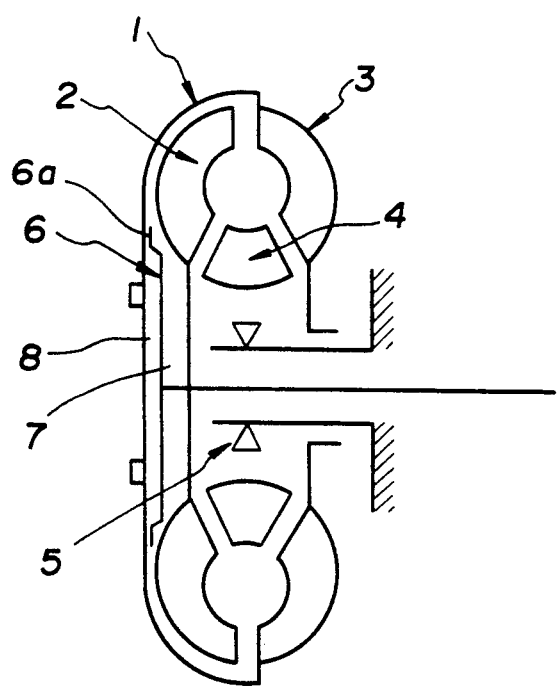
FIG. 2 is an enlarged schematic diagram showing the torque converter used in the automatic transmission of FIG. 1.

Referring to FIG. 2, the torque converter TC includes a converter cover 1 drivingly connected to the crankshaft (not shown) of the engine E. The torque converter TC also includes a turbine 2, an impeller 3, a stator 4, and a one-way clutch 5 arranged in a manner as well known to those skilled in the art. A lockup clutch 6 carries a friction surface 6a located at its radially outer end for drivingly engagement with the torque converter cover 1. The lockup clutch 6 defines an apply chamber 7 on the right side thereof, as viewed in FIG. 2, and a release chamber 8 on the left side thereof, as viewed in FIG. 2, along with the torque converter cover 1. A conventional lockup control valve (not shown) is provided for controlling the fluid pressures introduced into the apply and release chambers 7 and 8 so as to control the degree of slippage of the lockup clutch 6. The lockup clutch 6 is closed, locked, applied or engaged to complete a mechanical connection between the turbine 2 and the impeller 3 when the pressurized hydraulic fluid forces the friction surface 6a against the torque converter cover 1. This lockup clutch operation mode is referred to as a complete lockup mode. The lockup clutch 6 can operate in a slip lockup mode to provide a mechanical connection with a controlled degree of slip permitted between the turbine 2 and the impeller 3. The lockup clutch 6 is opened, unlocked, released or disengaged so that a hydrodynamic driving connection exists between the turbine 2 and the impeller 3 when pressurized hydraulic fluid is supplied through the release chamber 8 defined between the converter cover 1 and the friction surface 6a of the lockup clutch 6 to disengage these surfaces. This lockup clutch operation mode is referred to as a released lockup mode.

Returning to FIG. 1, an AIT control unit 10 is provided for controlling the automatic transmission AT and the lockup clutch 6. The AIT control unit 10 controls a lockup (LU) solenoid 11 provided for controlling the lockup control valve. The lockup solenoid 11 operates on a control signal having a variable pulse width or duty cycle fed from the A/T control unit 10. When the duty cycle of the control signal is zero percent, the pressure differential between the apply and release chambers 7 and 8 is substantially zero and the lockup clutch 6 operates in a released lockup mode upon increase in the duty cycle of the control signal, the pressure difference increases to place the lockup clutch 6 in the slip lockup mode. When the duty cycle is 100.9% the fluid pressure is introduced into the apply chamber 7 only so that the lockup clutch 6 operates in the complete lockup mode. The A/T control unit 10 performs the lockup clutch control based upon a specified one of various gear change mode and the throttle valve position. For example, the A/T control unit 10 operates the lockup clutch 6 in the complete lockup mode when the automatic transmission is in the third or fourth gear at a wide-open throttle valve position. In this case, the lockup mode is changed at the same time a gear change is produced.

The A/T control unit 10 also controls a line pressure (LP) solenoid 12, shift (SF) solenoids 13 and 14, and a timing (TM) solenoid 15 to make a gear change in the automatic transmission AT. The A/T control unit 10 makes the gear change based upon existing gear position, vehicle speed, oil temperature, and engine operating conditions. Thus, an inhibitor switch unit 21, a vehicle speed sensor 22 and an oil temperature sensor 23 are connected to the A/T control unit 10. An idle switch 31, a full-throttle switch 32, a throttle sensor 33 and an engine speed sensor 34 are connected through a conventional ECCS control unit 30 to the A/T control unit 10. The inhibitor switch unit 21 is comprised of various automatic transmission gear position switches including a 1st range switch, a 2nd range switch, a D range switch, a P range switch and an R range switch for producing a signal indicative of the existing gear position of the automatic transmission AT. The vehicle speed sensor 22 is provided at a position for sensing the speed of rotation of the output shaft of the automatic transmission. The oil temperature sensor 23 is provided for sensing the temperature of the lubrication oil. The idle switch 31 is associated with the throttle valve situated for controlling the air flow to the engine and it produces a signal when the throttle valve is at its fully-closed position. The full-throttle switch 32 is associated with the throttle valve and it produces a signal when the throttle valve is at its fully-open position. The throttle sensor 33 is associated with the throttle valve and it produces a signal indicative of the degree of opening of the throttle valve. The engine speed sensor 34 is associated with the engine distributor and it produces a pulse signal of a repetitive rate proportional to the engine speed.

The A/T control unit 10 employs a digital computer which includes a central processing unit (CPU), a random access memory (RAM), a read only memory (ROM), and an input/output control unit (I/O). The central processing unit communicates with the rest of the computer via data bus. The input/output control unit includes an analog-to-digital converter which receives analog signals from the various sensors and it converts the received signal into corresponding digital signals for application to the central processing unit. The read only memory contains the programs for operating the central processing unit. The random access memory contains appropriate data in look-up tables (relationship) used in calculating an appropriate value for the duty cycle of the control signal applied to control the lockup clutch 6. A control word specifying a desired duty cycle is transferred by the central processing unit to the input/output control unit which converts it into a control signal to the lockup solenoid 12 for controlling the degree of slip permitted in the lockup clutch 6.

Figure 3:
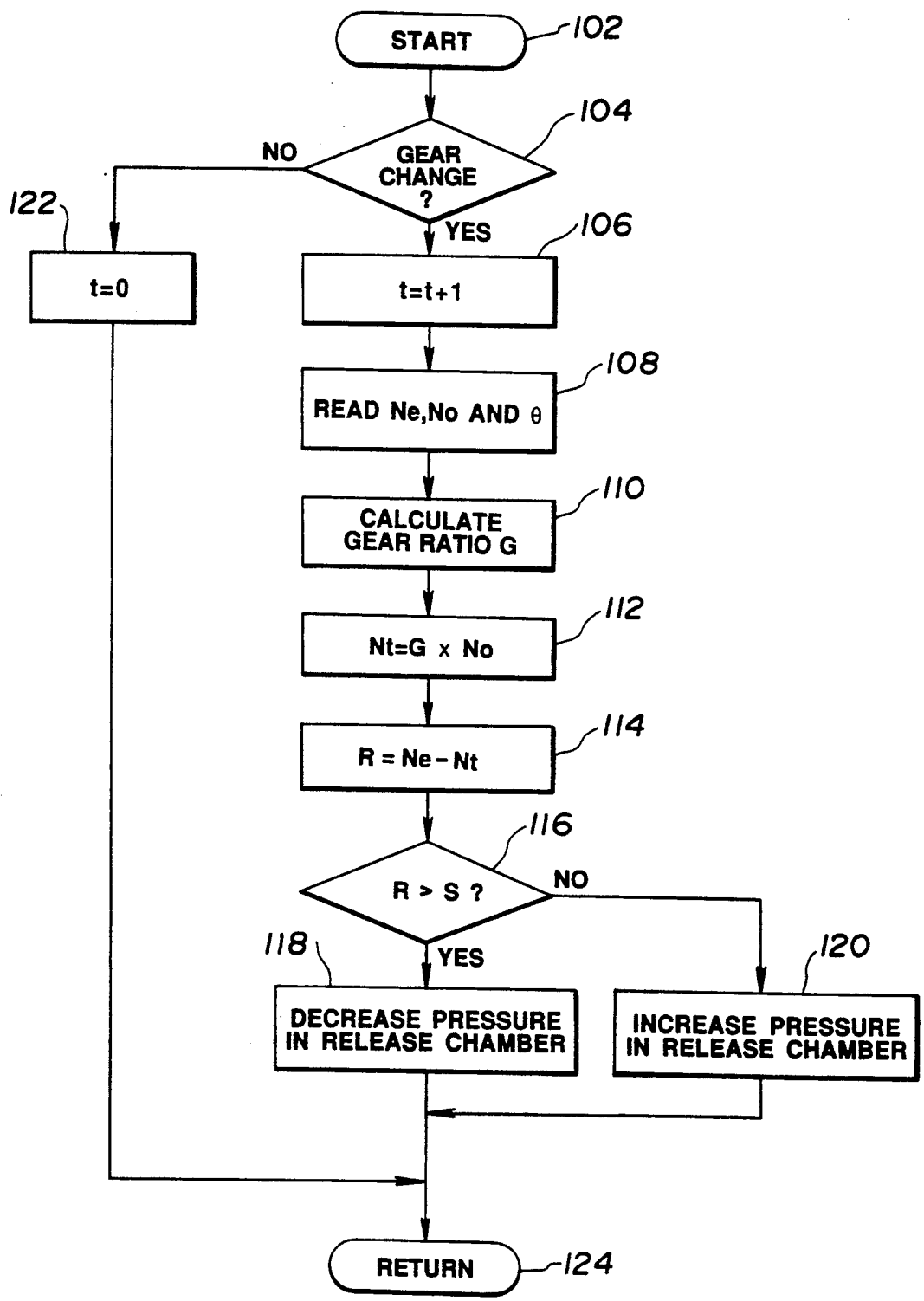
FIG. 3 is a flow diagram illustrating the programming of the digital computer as it is used to control the degree of slippage of the lockup clutch.

FIG. 3 is a flow diagram illustrating the programming of the digital computer as it is used to control the degree of slippage of the lockup clutch 6. The computer program is entered at the point 102. At the point 104 in the program, a determination is made as to whether or not any gear change is made in the automatic transmission. If the answer to this question is "yes", then the program proceeds to the point 106 where the count t of a timer counter is incremented by one step. Otherwise, the program proceeds to the point 122 where the count t of the timer counter is cleared to zero and then to the point 124 where the computer program is returned to the point 104. Thus, the count t of the timer counter indicates the time elapsed after the gear changing operation starts.

At the point 108 in the program, the engine speed Ne, the transmission output shaft speed No and the throttle valve position $\theta$ are read into the computer memory. At the point 110 in the program, a gear ratio G estimated for the existing gear change mode, for example, a change up from the third to fourth, is calculated from a relationship programmed into the computer. This relationship specifies the estimated gear ratio G as a function of the selected gear change mode and the measured lapse time t. For example, the relationship includes values G1, G2, t1 and t2 for each of the gear change modes where G1 is a gear ratio for the interval between the time at which a command to start a gear change is produced and the time at which the gear change starts, G2 is a gear ratio for the time interval after the gear change is completed, t1 is a time interval during which the gear ratio G1 is to be retained, and t2 is a time interval required for the gear ratio to change in a linear fashion from the gear ratio G1 to the gear ratio G2. The time intervals t1 and t2 may be obtained experimentally or derived empirically. Alternatively, the estimated gear ratio G may be calculated from a relationship which specifies the estimated gear ratio G as a function of the selected gear change mode, the measured lapse time t and throttle position $\theta$. In this case, the relationship may include values G1, G2, t1 and t2 for each of 8 sections into which each of the kinds of the gear changes is divided according to throttle valve position $\theta$. Preferably, the gear ratio G is calculated as $G = G1 + (G2 - G1) \times (t/t2)$.

At the point 112 in the program, the speed Nt of rotation of the turbine 2 is calculated based upon the transmission output shaft speed No and the estimated gear ratio G. This calculation is made as Nt = G x No. At the point 114 in the program, a degree R of slip in the torgue converter TC is calculated as $R = Ne - Nt$ where Ne is the sensed engine speed and Nt is the calculated turbine speed. At the point 116 in the program, a determination is made as to whether or not the calculated slip degree R is greater than a predetermined target speed S. If the answer to this question is "yes", then the program proceeds to the point 118 where a command is produced to decrease the hydraulic fluid pressure introduced into the release chamber 8. Following this, the program proceeds to the point 124 where the computer-program is returned to the point 104. If the calculated slip degree R is equal to or less than the target speed S, then the program proceeds to the point 120 where a command is produced to increase the hydraulic fluid pressure introduced into the release chamber 8. Following this, the program proceeds to the point 124.

This control sets the slip factor of the lockup clutch 6 at a predetermined value so as to operate the lockup clutch 6 in a slip lockup mode during a gear change. This is effective to suppress any increase in the engine speed Ne which may be caused by a change in the mode of operation of the lockup clutch 6 so as to minimize shocks and fuel consumption in the engine E.

Figure 4:
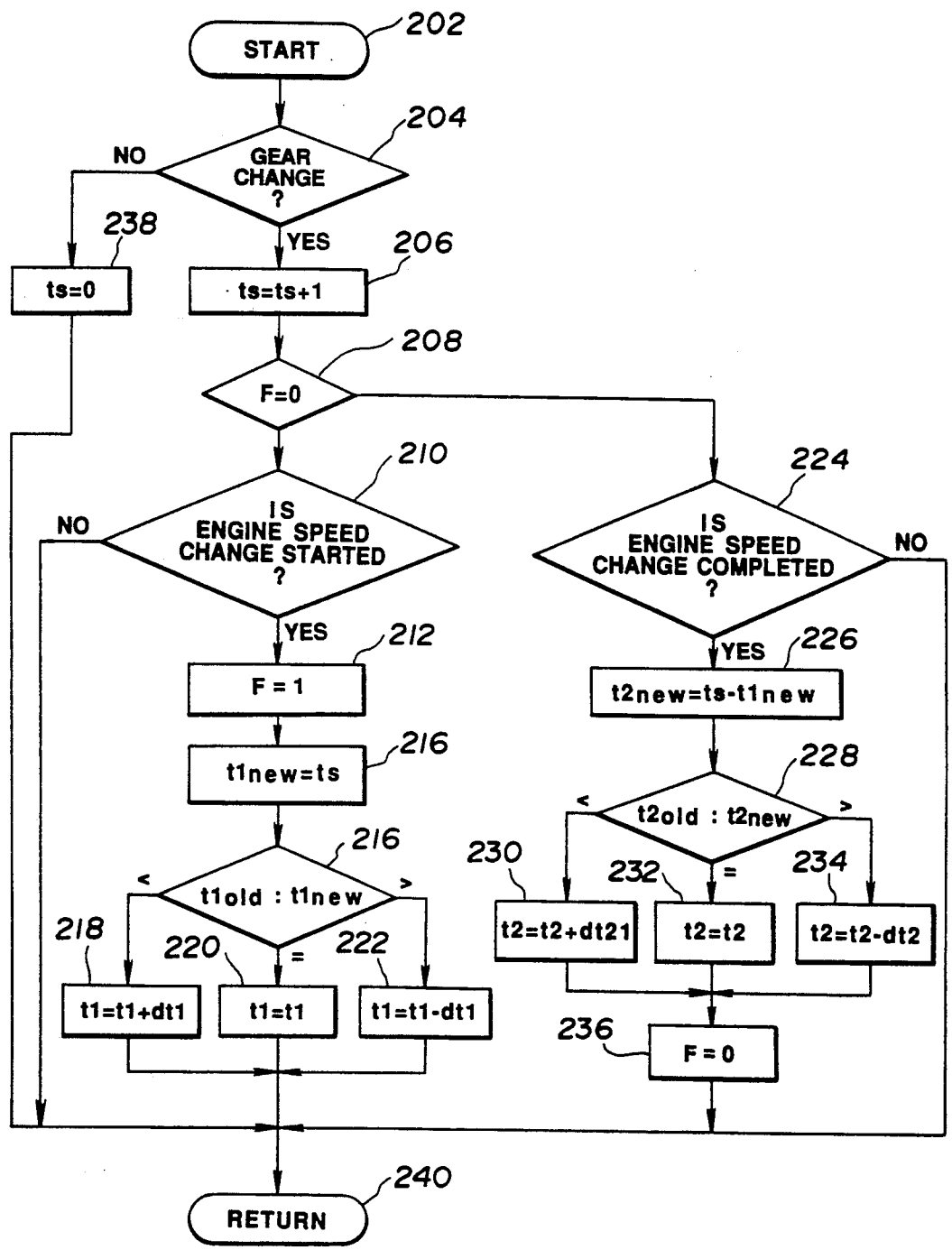
FIG. 4 is a flow diagram illustrating the programming of the digital computer as it is used to correct the time intervals used in calculating the gear ratio estimated for a specified one of various gear change modes.

FIG. 4 is a flow diagram illustrating the programming of the digital computer as it is used to correct the time intervals t1 and t2 used in calculating the gear ratio estimated for the existing gear change mode. The computer program is entered at the point 202. At the point 204 in the program, a determination is made as to whether or not any gear change is made. If the answer to this question is "yes", then the program proceeds to the point 206 where the count ts of a timer counter is incremented by one step. Otherwise, the program proceeds to the point 238 where the count ts of the timer counter is cleared to zero and then to the point 240 where the computer program is returned to the point 204. Thus, the count ts of the timer counter indicates the time interval time between the time at which the gear changing operation starts and the time at which the engine speed Ne starts changing.

At the step 208 in the program, a determination is made as to whether or not a flag F is set at 1. The flag F is initially cleared to zero. If the answer to this question is "yes", then the program proceeds to another determination step at the point 210. This determination is as to whether or not the engine speed Ne starts changing because of the gear changing operation. If the answer to this question is "yes", then the program proceeds to the point 212. Otherwise, the program proceeds to the point 240 where the computer program is returned to the point 204. At the point 212 in the program, the flag F is set at 1. At the point 214 in the program, the count ts of the timer counter is used as a new value $t1_{new}$ to update the time t1 required for the gear ratio G1 to be retained for the interval between the time at which a command is produced to start the gear changing operation and the time at which the gear changing operation starts.

At the point 216 in the program, the old value $t1_{old}$ of the time t1 stored in the last cycle of execution of this program is compared with the new value $t1_{new}$ of the time t1. If the old value $t1_{old}$ is less than the new value $t1_{new}$, then the program proceeds to the point 218 where the central processing unit increases the time t1 by adding a difference dt1 between the new and old values $t1_{new}$ and $t1_{old}$ to the old value $t1_{old}$ of the time t1. Following this, the program proceeds to the point 240. If the old value $t1_{old}$ is equal to the new value $t1_{new}$ then the program proceeds to the point 220 where the central processing unit retains the time t1 at the old value $t1_{old}$. Following this, the program proceeds to the point 240. If the old value $t1_{old}$ is greater than the new value $t1_{new}$, then the program proceeds to the point 212 where the central processing unit decreases the time ti by subtracting the difference dt1 from the old value $t1_{old}$ of the time t1. Following this, the program proceeds to the point 240.

If the flag F has not cleared to zero, then the program proceeds from the point 208 to another determination step at the point 224. This determination is as to whether or not the engine speed change is completed. If the answer to this question is "yes", then the program proceeds to the point 226. Otherwise, the program proceeds to the point 240 where the computer program is returned to the point 204. At the point 226 in the program, the central processing unit calculates a new value $t2_{new}$ of the time t2 by subtracting the new value $t1_{new}$ of the time t1 from the count is of the timer counter. The calculated new value $t2_{new}$ is used to update the time t2 required for the gear ratio G to change in a linear fashion from the gear ratio G1 to the gear ratio G2.

At the point 228 in the program, the old value $t2_{old}$ of the time t2 stored in the last cycle of execution of this program is compared with the new value $t2_{new}$ of the time t2. If the old value $t2_{old}$ is less than the new value $t2_{new}$, then the program proceeds to the point 230 where the central processing unit increases the time t2 by adding a difference dt2 between the new and old values $t2_{new}$ and $t2_{old}$ to the old value $t2_{old}$ of the time t2. Following this, the program proceeds to the point 236 where the flag F is cleared to zero and then to the point 240. If the old value $t2_{old}$ is equal to the new value $t2_{new}$, then the program proceeds to the point 232 where the central processing unit retains the time t2 at the old value $t2_{old}$. Following this, the program proceeds to the point 236 where the flag F is cleared to zero and then to the point 240. If the old value $t2_{old}$ is greater than the new value $t2_{new}$, then the program proceeds to the point 234 where the central processing unit decreases the time t2 by subtracting the difference dt2 from the old value $t2_{old}$ of the time t2. Following this, the program proceeds to the point 236 where the flag F is cleared to zero and then to the point 240.

This control updates the times t1 and t2 based upon the engine speed change each time a gear change is produced in the automatic transmission AT. The updated times t1 and t2 are used in a lockup clutch control made when the same gear change is produced in the automatic transmission AT. This is effective to absorb changes in the slip condition of the lockup clutch 6 caused by variations in the torgue of the engine E and the friction factor of the friction surface 6a of the lockup clutch 6 and changes in the lockup clutch 6 with time.

What is claimed is:

1. A lockup clutch control apparatus for use in an automotive vehicle including an internal combustion engine having a throttle valve, and an automatic transmission having an output shaft, an impeller, a turbine and a lockup clutch for producing selected one of a plurality of modes of gear change, comprising:
   first sensor means sensitive to a speed of rotation of the engine for producing a first sensor signal indicative of a sensed engine speed;
   second sensor means sensitive to a speed of rotation of the transmission output shaft for producing a second sensor signal indicative of a sensed transmission output shaft speed; and
   a control unit coupled to the first and second sensor means for controlling the lockup clutch, the control unit including means for measuring a lapse time after the selected gear change mode starts, means for calculating a gear ratio from a relationship specifying the gear ratio as a function of the selected gear change mode and the measured lapse time, means for storing the calculated gear ratio, means for calculating a speed of rotation of the turbine based upon the sensed transmission output shaft speed and the calculated gear ratio, means for calculating a difference between the sensed engine speed and the calculated turbine speed, means for operating the lockup clutch in a slip lockup mode to bring the calculated difference to a predetermined value, means for monitoring changes in the sensed engine speed to measure a time interval required for the selected gear change mode, and means for modifying the relationship to correct the gear ratio stored for the selected gear change mode based upon the measured time interval.

2. The lockup clutch control apparatus as claimed in claim 1, wherein the relationship having values G1, G2, t1 and t2 stored for each of the gear change modes, where G1 is a first gear ratio selected in an interval between a time when a gear change start command is produced to start the selected gear change mode and a time when the selected gear change mode starts, and G2 is a second gear ratio selected in a time interval after the selected gear change mode is completed, t1 is a first time interval during which the first gear ratio G1 is selected, and t2 is a second time interval required for the gear ratio to change in a linear fashion from the first gear ratio G1 to the second gear ratio G2.

3. The lockup clutch control apparatus as claimed in claim 2, wherein the means for modifying the relationship includes means for correcting the value t1 based upon a time interval required for the sensed engine speed to decrease after the gear change start command is produced, and means for correcting the value t2 based upon a time interval during which the sensed engine speed is changing.

4. The lockup clutch control apparatus as claimed in claim 1, which further comprises third sensor means sensitive to a position of the throttle valve for producing a third sensor signal indicative of a sensed throttle valve position, wherein the control unit includes means for calculating the gear ratio from a relationship specifying the gear ratio as a function of the selected gear change mode, the sensed throttle valve position and the measured lapse time.

5. The lockup clutch control apparatus as claimed in claim 4, wherein the relationship having values G1, G2, t1 and t2 stored for each of the gear change modes, where G1 is a first gear ratio selected in an interval between a time when a gear change start command is produced to start the selected gear change mode and a time when the selected gear change mode starts, and G2 is a second gear ratio selected in a time interval after the selected gear change mode is completed, t1 is a first time interval during which the first gear ratio G1 is selected, and t2 is a second time interval required for the gear ratio to change in a linear fashion from the first gear ratio G1 to the second gear ratio G2.

6. The lockup clutch control apparatus as claimed in claim 5, wherein the means for modifying the relationship includes means for correcting the value t1 based upon a time interval required for the sensed engine speed to decrease after the gear change start command is produced, and means for correcting the value t2 based upon a time interval during which the sensed engine speed is changing.

* * * * *